(12) United States Patent
Eidelman

(10) Patent No.: US 8,850,274 B2
(45) Date of Patent: Sep. 30, 2014

(54) METHOD OF EMBEDDING CONFIGURATION DATA IN A NON-CONFIGURATION DOCUMENT

(75) Inventor: Sergey Eidelman, Bolton, MA (US)

(73) Assignee: Empirix, Inc., Billerica, MA (US)

( * ) Notice: Subject to any disclaimer, the term of this patent is extended or adjusted under 35 U.S.C. 154(b) by 401 days.

(21) Appl. No.: 13/363,754

(22) Filed: Feb. 1, 2012

(65) Prior Publication Data

US 2013/0198569 A1    Aug. 1, 2013

(51) Int. Cl.
*G06F 11/00*    (2006.01)

(52) U.S. Cl.
USPC .......................................................... 714/57

(58) Field of Classification Search
USPC .......................................................... 714/57
See application file for complete search history.

(56) References Cited

U.S. PATENT DOCUMENTS

| | | | |
|---|---|---|---|
| 6,810,494 B2 * | 10/2004 | Weinberg et al. | 714/46 |
| 7,050,941 B2 * | 5/2006 | Wada | 702/185 |
| 7,054,881 B2 * | 5/2006 | Arcand et al. | 707/687 |
| 7,222,255 B1 * | 5/2007 | Claessens et al. | 714/4.12 |
| 7,366,955 B2 * | 4/2008 | Kuturianu et al. | 714/38.14 |
| 7,664,990 B2 * | 2/2010 | Kodaka et al. | 714/38.1 |
| 8,126,577 B2 * | 2/2012 | Ticknor et al. | 700/83 |
| 8,386,419 B2 * | 2/2013 | Yalamanchilli | 707/602 |
| 8,666,518 B2 * | 3/2014 | Ticknor et al. | 700/83 |
| 2002/0042897 A1 * | 4/2002 | Klein et al. | 714/718 |
| 2004/0153822 A1 * | 8/2004 | Arcand et al. | 714/38 |
| 2005/0076282 A1 | 4/2005 | Thompson et al. | |
| 2006/0294434 A1 * | 12/2006 | Ikeda et al. | 714/38 |
| 2008/0183416 A1 * | 7/2008 | Matsuoka | 702/119 |
| 2008/0256135 A1 | 10/2008 | Nelson et al. | |
| 2010/0095276 A1 * | 4/2010 | Ottavi et al. | 717/125 |
| 2010/0115342 A1 * | 5/2010 | Shigeta et al. | 714/37 |
| 2011/0179324 A1 * | 7/2011 | Lai et al. | 714/723 |
| 2013/0042222 A1 * | 2/2013 | Maddela | 717/124 |
| 2013/0049794 A1 * | 2/2013 | Humphrey et al. | 324/764.01 |
| 2013/0085680 A1 * | 4/2013 | Arlen et al. | 702/19 |
| 2014/0095931 A1 * | 4/2014 | Sadasivam et al. | 714/28 |

OTHER PUBLICATIONS

International Patent Application No. PCT/US2013/024502: International Search Report and Written Opinion dated Apr. 16, 2013, 11 pages.

* cited by examiner

*Primary Examiner* — Bryce Bonzo
(74) *Attorney, Agent, or Firm* — Baker & Hostetler LLP (57) ABSTRACT

Embodiments are directed to a method of embedding configuration files in a document generated by a system, with the configuration file including settings associated with the generation of the document. A particular embodiment is directed to the embedding of configuration files of a testing system in a report document generated by the testing system. The configuration file includes system settings and external settings in association with the test results documented in the report document. For example, a testing system can generate a PDF report document associated with a test performed, and embed configuration files into the PDF report document. The embedding of configurations files in the PDF document can be done by using standard embedding mechanisms already available in the PDF file format and supported by most PDF viewing tools. The embedding of the configuration file can be performed automatically when the report document is generated.

20 Claims, 6 Drawing Sheets

FIG. 1

```xml
<Configs><NCfgFile>
<MetaData>
        <Property name="CfgId" value="1" displayname="Id"/>
        <Property name="CfgDisplayName" value="Web Server 1"
        displayname="Name"/>

...
        <Property name="PluginName" value="httpserver" displayname="Type"/>
</MetaData>
<Parameters>
        <Parameter>
                <Name>InitialUploadRate</Name>
                <Value>1500000</Value>
        </Parameter>
        <Parameter>
                <Name>MaxUploadRate</Name>
                <Value>1000000</Value>
        </Parameter>
        <Parameter>
                <Name>ShowUploadRate</Name>
                <Value>false</Value>
        </Parameter>
        <Parameter>
                <Name>IPType</Name>
                <Value>ip4</Value>
        </Parameter>
        <Parameter>
                <Name>NetAddrPrefixLen</Name>
                <Value>8</Value>
        </Parameter>
                <Parameter>
                <Name>NextHopRouter</Name>
                <Value>0.0.0.0</Value>
        </Parameter>

...
</Parameters>
</NCFgFile></NProjectFile>
```

METHOD OF EMBEDDING CONFIGURATION DATA IN A NON-CONFIGURATION DOCUMENT

CROSS-REFERENCES TO RELATED APPLICATIONS

Not applicable.

BRIEF DESCRIPTION

Embodiments are directed to a method of embedding configuration files in a document generated by a system, with the configuration file including settings associated with the generation of the document. A particular embodiment is directed to the embedding of configuration files of a testing system in a report document generated by the testing system. The configuration file includes system settings and external settings in association with the test results documented in the report document. For example, a testing system can generate a PDF report document associated with a test performed, and embed configuration files into the PDF report document. The embedding of configuration files in the PDF document can be done by using standard embedding mechanisms already available in the PDF file format and supported by most PDF viewing tools. The embedding of the configuration file can be performed automatically when the report document is generated. Alternatively, the user of the testing system can be prompted to confirm whether the configuration file is to be included in the report document.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND

Testing systems and tools typically generate report documents including results, assessments, and summaries of findings discovered during a test performed by the system and tools. For example, if a testing system is used to test a network device, then a report document may be generated at the end of the test indicating the performance of the network device according to a number of metrics.

Reports are generated in a wide range of formats. The reports can be saved to a file or they can be viewed within the testing system. The Portable Document Format (PDF) is a popular file format used for generating and saving test reports to a file, due to the PDF format being a widely used open standard for document exchange. Other widely used formats include MICROSOFT WORD DOC documents and HTML documents. In particular, both PDF and DOC documents can be used to package a multi-page document in a single file. However, just as important as the results, is the set of settings and configuration of the testing system which yielded the particular results of the system or device under test. The testing system settings, depending on the complexity and range of options provided, can be scattered and hidden under many menus, submenus, and dialogs. Some testing systems provide options for exporting the configuration data of the testing system to one or more configuration files. If the testing system itself stores all of the configuration data in one or more files, then the one or more files can also be accessed by the user, but only if the user knows under which directory such configuration files are located. Different systems also store their corresponding settings using different file structures, making it necessary for users to browse and search for configuration files in order to find them.

The names of configuration files also tend to be nondescript, making it difficult to determine the contents of a configuration file based on a nondescript name. It can also be the case that a configuration file may not be in a human-readable format, and even if a configuration file was in a human-readable format, the configuration file may not include one or more settings that are important to the user. In addition, if the user decided to edit the configuration file, the resulting configuration file may be corrupt or the testing system may not recognize the edits made to the configuration file.

For testing systems that support the importing and exporting of configuration files, importing configuration files to a test system may be desired if reproduction of the test with exactly the same parameters is required. It may also be desirable to import the parameters from the configuration files with the intention of modifying the previously conducted test in a particular way. For example, if during actual use of a system a particular behavior is observed similar to the behavior exhibited in the test scenario, then it may be desirable to import the configuration files associated with the relevant test scenario, and modify the imported parameters to assess how performance varies with changes to the imported parameters, shedding light into the particular behavior observed during actual use.

DETAILED DESCRIPTION

Embodiments are directed to a method of embedding configuration files in a document generated by a system, with the configuration file including settings associated with the generation of the document. A particular embodiment is directed to the embedding of configuration files of a testing system in a report document generated by the testing system. The configuration file includes system settings and external settings in association with the test results documented in the report document. For example, a testing system can generate a PDF report document associated with a test performed, and embed configuration files into the PDF report document. The embedding of configurations files in the PDF document can be done by using standard embedding mechanisms already available in the PDF file format and supported by most PDF viewing tools. The embedding of the configuration file can be performed automatically when the report document is generated. Alternatively, the user of the testing system can be prompted to confirm whether the configuration file is to be included in the report document.

The embedding of the configuration file in a document allows the automatic coupling of a document with the configuration settings used to generate the document. If it was needed to replicate the original conditions of a system that yielded the document, then the configuration file can be extracted and examined manually, or the configuration file can be loaded to the system by loading the document itself. In the context of a testing system, if a user wanted to rerun a test to replicate the results in a report document, then the report document can be loaded into the testing system, automatically extracting the configuration file and applying the appropriate settings to the testing system.

Embodiments are not limited to embedding configuration files in a document. In file formats that support the addition of metadata, one or more settings from a configuration file can be embedded in a document as metadata fields. In addition, the configuration data need not be settings typically stored in a configuration file. The user can be provided with a list of all settings, or with a subset of all settings available in a system, and the user can select which settings to save and embed in a document generated by the system. From herein embodiments will be described as embedding a configuration file in a document, rather than saving configuration settings using metadata fields. However, both of these embodiments are equally within the scope of this invention.

Figure 1:
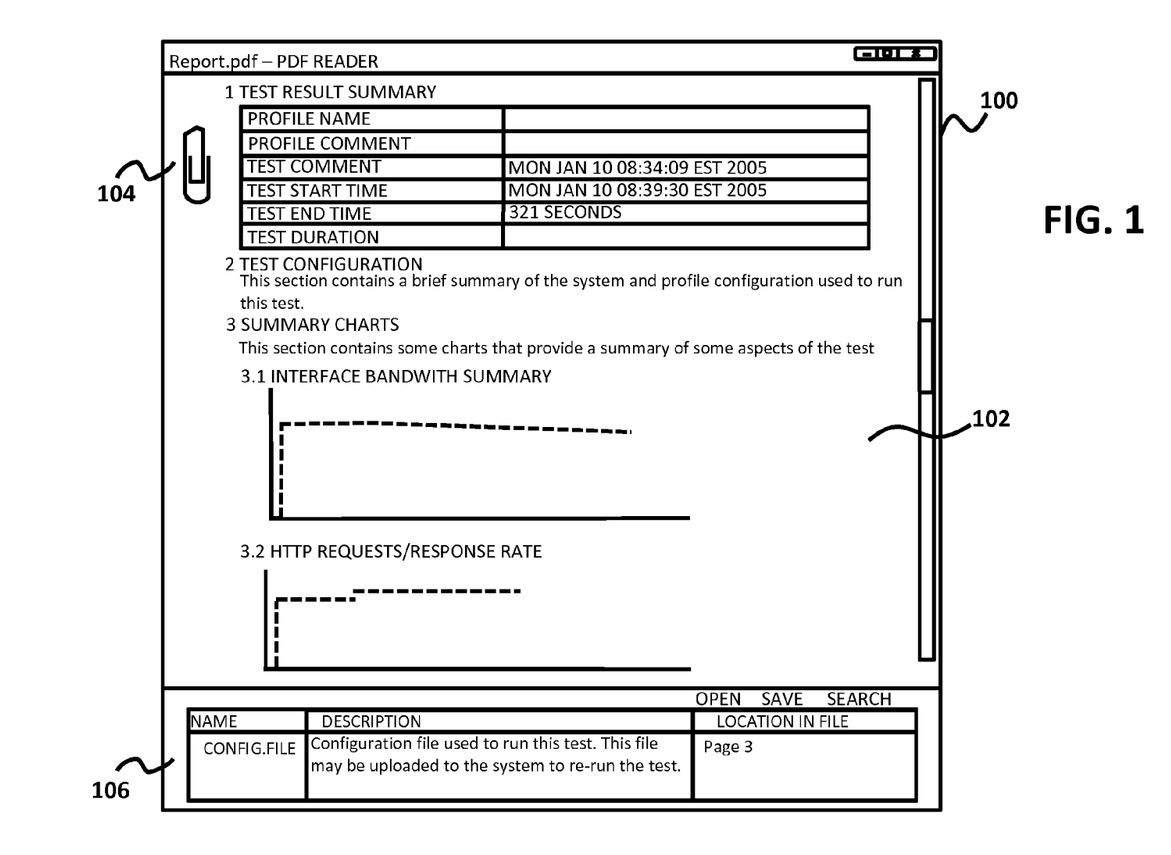
FIG. 1 illustrates a screenshot of a PDF document with a configuration file embedded in accordance with an embodiment, the configuration file being associated with the test results contained in the PDF document.

The configuration files embedded in a document can be extracted manually by a user, automatically by the system that generated the document with the embedded configuration file, automatically by another system similar to the system that generated the document with the embedded configuration file, or with a parsing/extraction tool. When extracting configuration files manually, the user can extract the configuration files by following links in the body of the document or by following a table of embedded documents. FIG. 1 illustrates an example of a PDF document viewer 100 displaying a PDF document 102, with an embedded configuration file represented by the paper clip icon 104.

Configuration files 104 can be extracted automatically by loading the document 100 generated by a system back into the system. The loading of the document can be performed by browsing for the document and loading the document using the system's standard procedure for loading files. Alternatively, the system can provide an additional option for loading a configuration file after it has been manually extracted from the document or for loading the document with the embedded configuration file. After the document is loaded, the system can parse and examine the contents of the document to determine whether a configuration file is embedded in the document. If a configuration file is found in the document, then the settings from the configuration file can be extracted and applied to the system.

The configuration file embedded in a document, generated by a first system, can also be extracted by a second system similar to the first system. For example, if a user has two similar test beds, then the user can run a test on a first test bed, and generate a document including results associated with the test and having a configuration file embedded in the document. The user can subsequently upload the document to the second system in order to rerun the test originally performed on the first system. Thus, embodiments enable physically different systems, being of a similar type, to perform similar tests by loading the report documents generated by each testing system. A document can also be shared among users of testing systems, enabling a first user to perform a test on a first test bed, and share the generated report document with a second user. The second user can rerun the test on a second test bed of the second user by loading to the second test bed the report document obtained from the first user.

Similarly, the document can be loaded to a parsing or extraction tool. The parsing or extraction tool can examine the contents of the document to determine whether a configuration file is embedded in the document. If there is a configuration file present, the parsing or extraction tool can extract the configuration information and automatically communicate it to the testing system.

Figure 2:
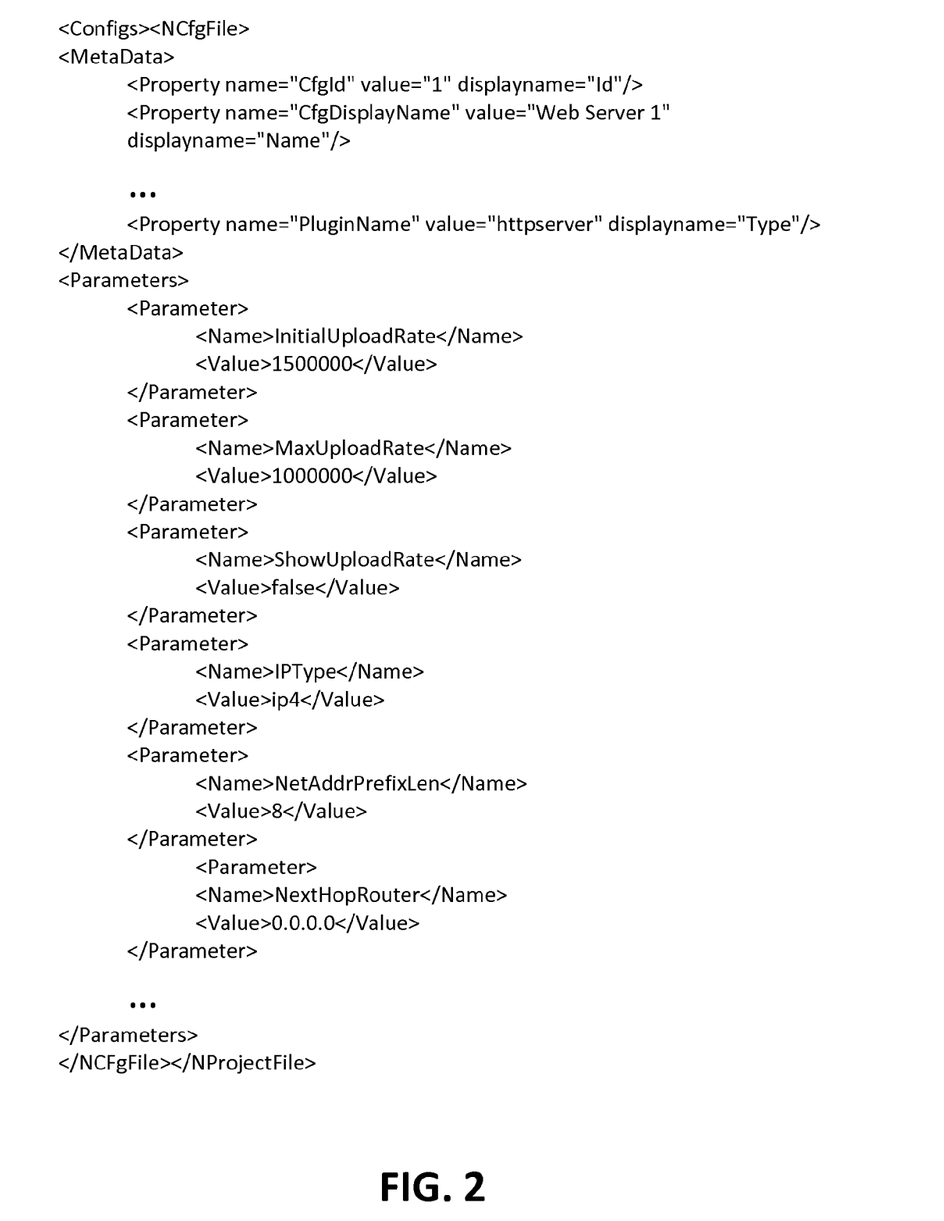
FIG. 2 illustrates a sample configuration file associated with a testing system in accordance with an embodiment.

Embodiments can embed configuration files in PDF files, in MICROSOFT OFFICE documents, in Open Document files, etc. While embodiments illustrated herein are described in reference to the PDF format, it is to be understood that any file format or other document containers that allow for file embedding can be used for embedding of configuration files in a document. In addition, it is to be understood that embodiments described herein will be described in reference to a testing system generating a report document in association with a particular test performed by the testing system. The testing system embeds in the report document a configuration file containing the settings used by the testing system during the particular test. However, alternative embodiments can use the methods described herein with other types of systems and with alternative file formats. The format of the configuration file is dependent on the system generating the document. Thus, the configuration file can be an XML file, YAML file, a raw text file, etc. FIG. 2 illustrates a sample configuration file of a testing system in XML format.

When a testing system performs a test of a system or device under test, a report is usually generated to communicate to the user an assessment of the system. The assessment may indicate to the user the performance of the system in terms of a number of metrics tested by the testing system. However, testing systems are used to test a wide range of scenarios and conditions, resulting in the testing system having to be reconfigured in order to perform different tests. Further, it may be necessary to rerun a test in order to replicate the results documented in a report document, or it may be desired to rerun a variation of a previous test. However, unless the settings have been manually recorded by the user, the user is then forced to remember the appropriate settings which yielded the results documented in a report document.

Reports generated to document the results of a test performed by a testing system usually contain graphical and numerical summaries, rather than including the specific settings of a system used during the test. For example, in a system that tests network equipment by emulating user behavior and network traffic, a particular test may have been configured to emulate 100 users at a time, with half of the emulated user sessions emulating web browsing traffic and the other half of the emulated user sessions emulating VOIP traffic. While the final test report may provide a graphical summary as shown in FIG. 1, this does not necessarily and automatically translate to the actual settings in the system. Thus, the generated report may omit information needed by the system to actually perform the test, but which was unnecessary to include in the report document. The report document may also describe configuration data in a user friendly matter, making it ambiguous as to whether such configuration data describes settings that need to be set via the testing system's interface. The description of this configuration data in a common written language also does not indicate to the user where the corresponding settings are located in the testing system's interface. Thus, from the numerical, graphical, and textual description contained in a report document, a user would be required to associate the information from the report with the corresponding options, menus, submenus, and dialogs in the system's interface. If the user is manually translating the summarized information from the report document, the user may also forget to set a parameter based on a piece of information from the report. All in all, a report document summarizes the results from a test in a user friendly format, and does not typically include cryptic test configuration data used to perform the test.

Embedding a configuration file within a document, with the document generated by a testing system after performing a test using the settings from the configuration file, increases portability and sharing among one or more testing users and among one or more testing systems. With embodiments described herein, a first user need only share the document with a second user to enable the second user to replicate the test conducted by the first user, rather than forcing the second user to configure the testing system from scratch or forcing the second user to configure the testing system based on the numerical and textual data included in the document. If the user needed to run the same test on a different system, the user would only need to load the document into the different system without having to search or compile an additional configuration file.

Embodiments further enable a user to make the decision to replicate a test based on the information conveyed in a document, rather than having to base that decision on examining and analyzing the cryptic contents of a configuration file. Embodiments also provide a method for automatically recording and logging the settings of a system during each test.

As previously noted, FIG. 1 illustrates a PDF document viewer 100 displaying a PDF document 102 with an embedded configuration file 104. The document 102 represents an example of a report generated by a testing system and including graphical, numerical, and textual summaries of a test performed. The report includes a table showing a test result summary, a test configuration section, and a summary charts section. The paper clip 104 to the left of the table represents the configuration file embedded with the document. Specifically, the configuration file was embedded as an attachment to the page of document 102 illustrated in FIG. 1. The configuration file can also be embedded as an attachment to the document 102, rather than being an attachment to a specific page of the document 102.

The PDF document viewer 100 further includes an attachment panel 106 listing all of the attachments included in the document 102. Document 102 includes one attachment, named "CONFIG.FILE." The attachment panel 106 displays a description of the attachment and the location of the attachment in the file. FIG. 1 is meant to illustrate how an attachment included in a PDF document would be viewed in a particular PDF viewer. Therefore, it is to be understood that embodiments are not limited by the embodiments illustrated in the figures. For instance, different PDF viewers may provide access to the attachments in different ways. For example, the attachment panel may be located on the left side of the screen, on the right side of the screen, as a floating panel, as a list on a menu, etc. Similarly, different PDF viewers may use different icons to indicate that an attachment has been attached in a particular page of a PDF document.

The configuration file can include more than type of configuration information associated with a particular test run. The configuration file can include the system name, the system IP address, user configuration information, and user interface preferences. In one embodiment, the configuration file can include configuration settings associated with two or more different tests, with the user given the option to select which of the two or more configuration setting to use. The configuration file can also include the configuration settings associated with all of the tests performed during a testing session. For example, if a user creates a series of tests designed to test different aspects of a device, or designed to perform the same test on two different devices, then the configuration settings needed to recreate the series of tests can be stored in the configuration file embedded in the corresponding report document.

The configuration file can also include external configuration information and settings. For example, the configuration file can include information about how the testing system is physically and logically connected to the device under test. Further, configuration information associated with the device under test can also be embedded in the configuration file. When combining the configuration settings of the testing system, external configuration settings, and settings of the device under test, all of these settings can be combined into a single configuration file. Alternatively, these settings can be divided into three configuration files, and all three configuration files can be embedded in the document generated by the testing system.

When embedding external configuration information, the user can be given the option to specify the external configuration information prior to the document generation. For example, the user can specify the location of the external configuration information, with the location being a local file or a file on a remote location. Alternatively, the user can load configuration files from the device under test to the testing system, with the testing system providing an option for loading external configuration files. The embedding of external configuration information can also be performed automatically by the system, with the system using the API of the device under test to obtain the settings of the device under test.

The method for embedding configuration information in a document can be implemented by the functionality of a system. However, the functionality for embedding configuration information in a document can also be supported through plug-ins, add-ins, macros, and/or through the API exposed of the system.

As noted above, embodiments are not limited to embedding configuration information into PDF documents. Any file format that supports the embedding of additional files can also be used for embodiments of the method described herein. For instance, MICROSOFT OFFICE DOCUMENTS, including DOC files and DOCX files, also support the embedding of files. If a testing system generates documents using a MICROSOFT WORD file format, then the configuration file associated with the testing system can be embedded in the generated DOC and DOCX file documents. Similarly, if a MICROSOFT EXCEL spreadsheet is generated by the testing system as a report document, then the spreadsheet document can also include the configuration file or configuration data associated with the test. The OPENOFFICE file format also allows for the embedding of documents into an OPENOFFICE document.

Figure 3:
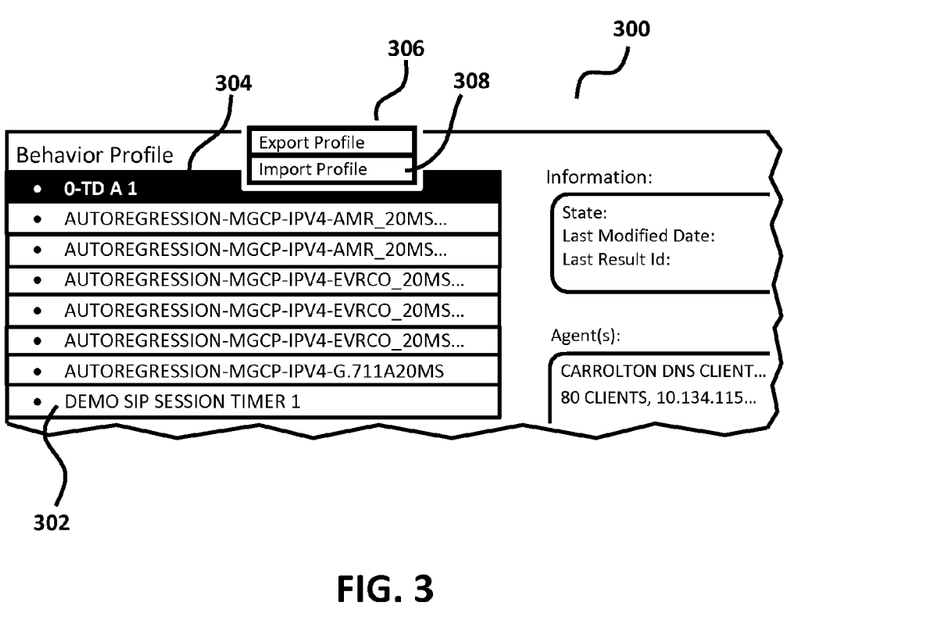
FIG. 3 illustrates an embodiment of a testing system having an interface that enables a user to load a configuration file embedded in a PDF document.

FIG. 3 illustrates a partially broken view of the interface 300 of a network testing system that emulates behavior of users and devices to test network equipment and which predicts user experience. The interface provides a listing 302 of behavior profiles, with each behavior profile representing a particular user behavior emulated by the testing system. When a behavior profile is selected, such as the selected behavior profile "0-TD A 1" (304), a pop-up menu 306 displays the option of exporting the behavior profile to a file or importing the behavior profile from a file. In this case, selecting the import profile option 308 brings up the dialog shown on FIG. 4.

Figure 4:
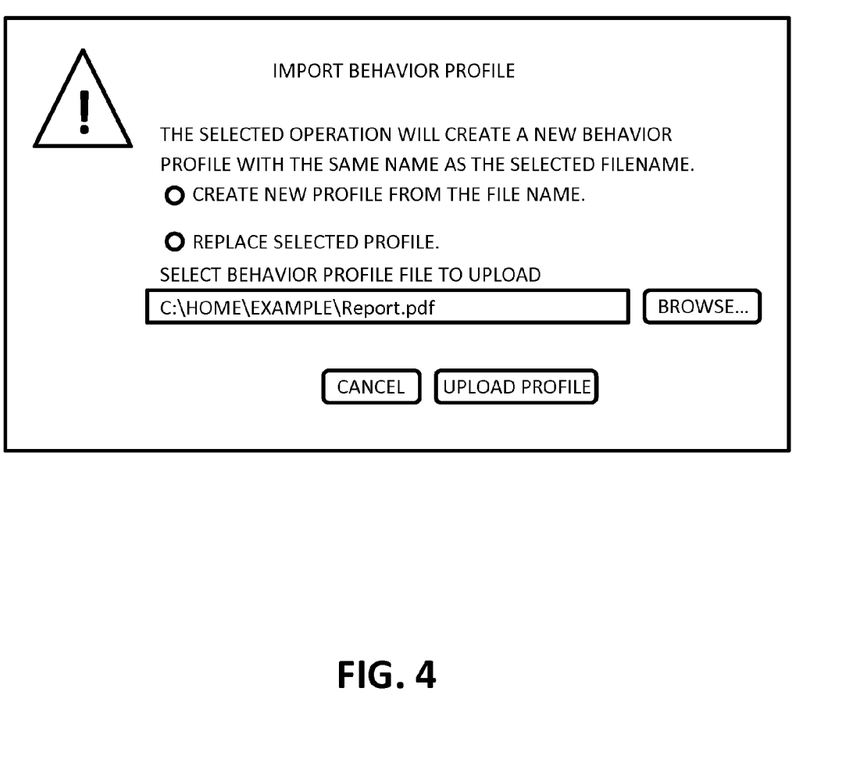
FIG. 4 illustrates a dialog window in accordance with an embodiment enabling a user to load a configuration file embedded in a PDF document.

The import behavior dialog from FIG. 4 allows the user to create a new profile from the file being imported or to replace the selected profile with the contents from the file being imported. However, rather than loading a configuration file associated with the testing system, the user needs only to load a PDF version of a report. In FIG. 4, the user is loading the "Report.pdf" file. The system determines whether the file being imported is a configuration file, or whether the file being loaded is a PDF document with an embedded configuration file. If the system generates documents in various file formats, and the configuration files are embedded in the documents in the various file formats, then the system may first check the file format being imported, and subsequently extract the configuration file based on the file format. On the other hand, if the system generates all documents in one file format, or if the system only supports the extraction of configuration files from reports generated in a specific file format, then the system need only check whether the user is loading a configuration file or a document, and take the appropriate action.

When a configuration file is imported into a testing system by importing a document generated by the testing system, all of the configuration data is extracted from the configuration file, and the various settings and other configurations stored in the configuration file are used to set system settings, user interface settings, or settings for a new test run. If the configuration file includes configuration settings for an external device or for the device under test, these settings are applied also.

Figure 5:
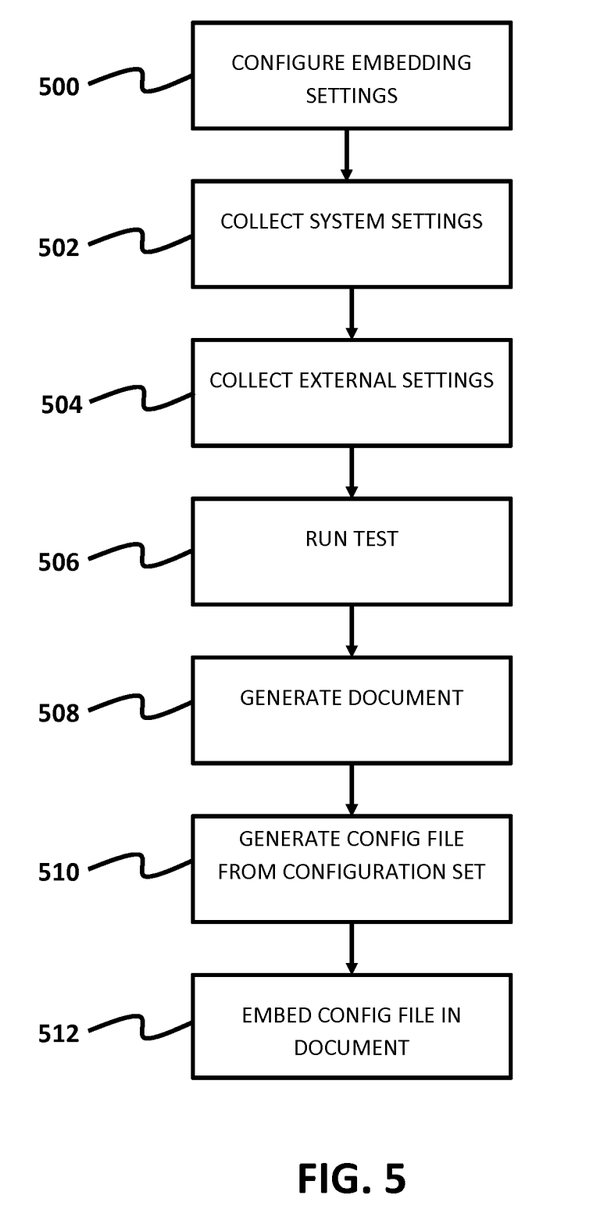
FIG. 5 illustrates a block diagram showing the steps involved in the embedding a configuration file in a report document in accordance with an embodiment.

FIG. 5 illustrates a block diagram showing the steps involved in the embedding of a configuration file, or a configuration set, in a document generated by the system. In step 500, the user configures how a configuration file is embedded in documents, i.e. embedding function settings. Embedding function settings can include the name of the configuration file, a description associated with the configuration file, the file format for the configuration file, and the types of documents or reports which are to include the embedded configuration files. The user can also specify the actual settings to include in the embedded configuration files. For example, the user can select user interface settings, system wide settings, and settings associated with tests performed by the testing system.

Step 500 further enables the user to customize the embedding of external configuration settings in configuration files. For instance, the user can specify the location of a configuration file associated with an external device or a device under test. The user can also provide a unique identifier (such as the IP address) of the device under test. The external configuration file or the configuration data associated with the external device or the device under test can be retrieved by communicating with the device using the unique identifier.

Step 500 is an optional step, as the system can automatically embed configuration files in documents by using a set of default settings. If the user wishes to change the embedding function, then the user can change the embedding function settings. The system can prompt the user to edit the embedding function settings prior to or after a test runs, at system start-up, or during the initial testing system set-up. The user can also manually edit the settings of the embedding function at any time, including prior to or after a test, or at times when it is not desired to run a test.

In step 502, the corresponding settings of the system are aggregated into a configuration set. This step may also consist of saving the configuration set to a configuration file, with the configuration file subsequently being embedded in documents generated by the system. The settings that are aggregated into the configuration set depend on the settings specified by the user in step 500. For instance, if the user specified in step 500 that all of the user interface settings are to be included in the configuration file, then in step 502 all of the corresponding settings would be collected and saved to a configuration set. Similarly, if the user indicated any external system settings, then in step 504 all of the external system settings are automatically aggregated and added to the configuration set. The aggregated external system settings can also be saved to a second configuration file, with the second configuration file also embedded in the document generated by the testing system.

Steps 500, 502 and 504 can be performed at different times without departing from the spirit of the invention. FIG. 5 illustrates an embodiment where steps 500-504 are performed before running the test. In yet another embodiment, steps 500-504 can be performed during the initial system configuration, or at any other time that a user of the testing system wishes to change the configuration of the system or the configuration of the embedding function.

Steps 500-504 can also be performed after running the test and before generating the document. After a particular test is run using the current system settings, the system can optionally prompt the user to specify settings for the embedding function, automatically collect system settings, automatically collect external settings, and generate a configuration set based on the system settings and the external settings.

In step 506 a particular test is run using the current system settings. This step may involve running the test once, running two or more variations of the same test, or running different tests. In step 508, the document is generated based on the results of step 506. In step 510, the configuration set is saved to a configuration file. This step can be performed prior to the document generation, prior to running any tests, or after any time the user of the testing system changes settings of the testing system. Finally, in step 512 the configuration file is embedded in the document. In an alternative embodiment, the configuration set can be embedded directly in the document as metadata fields, without the need for the configuration set to be saved to a configuration file.

Figure 6:
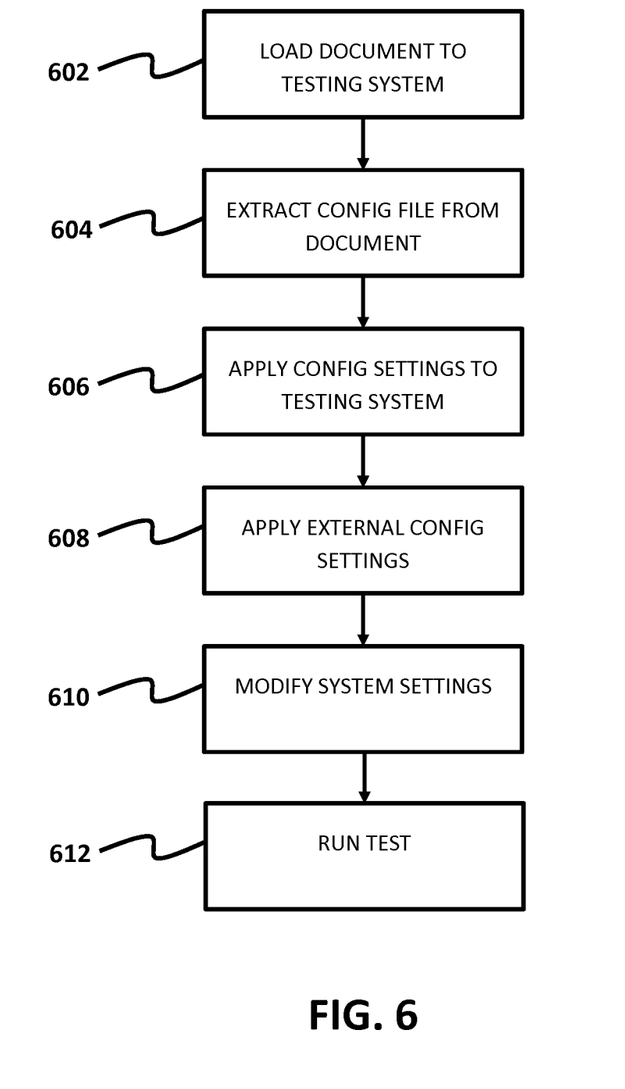
FIG. 6 illustrates a block diagram showing the steps involved in the loading of a configuration file embedded in a report document in accordance with an embodiment.

FIG. 6 illustrates a block diagram showing the main steps of loading the configuration file from a report document. Step 602 consists of loading the document via the testing system's interface. Hence, rather than having to search for a particular configuration file, or rather than trying to remember the settings that yield a particular type of result, the user can simply load a document without having to discern from the contents of configuration files. Most importantly, the settings are extracted and applied automatically. Thus, all of the settings from the configuration file embedded in the document are automatically applied to the testing system, rather than the user having to remember all of the settings necessary to yield a particular type of test. In embodiments, the document includes data analytics, summaries, and other human readable data, allowing the user to indirectly select the appropriate settings to apply to a testing system based on the contents of the document.

In step 604, the configuration file is extracted from the document, and in step 606 the configuration settings are applied to the testing system. If the configuration file included external configuration settings, then these settings are applied in step 608 to other devices interacting with the testing system, such as the device under test. In step 610 the user can modify any of the configuration settings loaded. For example, if the user is interested in running a variation of the test that produced the report document, then the user can modify various settings. Finally, in step 612 a test can be run using the loaded configuration settings. Step 612 can be performed manually by the user or it can be performed automatically by the testing system after all of the configuration settings have been set.

In a particular embodiment, a listing of all the configuration settings being loaded, and the settings being overridden with the configuration settings, can be displayed to the user prior to overriding the current values of the system settings. For example, the configuration settings can be presented to the user in a list or in a table. The user can then be prompted to accept the modifications or cancel the modifications. The user can also be given the choice to edit the configuration settings prior to overriding the current values of the system settings. Finally, the user can be given the option to save the current settings of the system to a file or to memory, allowing the user to retrieve the original system settings at a later time.

If the configuration file includes settings associated with more than one test performed by the testing system, or conflicting configuration settings for two or more parameters, then these conflicting values can be highlighted and presented to the user. The user can then select which of the two or more conflicting values to use for a parameter. Configuration settings can also be organized into groups, with the configuration settings for a first test being placed under a first group, and the configuration settings for a second test being placed under a second group. These groups of settings can be stored in a single configuration file embedded in a document, and when the document is imported to the testing system, the user can be presented with the differences between the two groups, or the two groups can be presented separately, allowing the user to select between the two groups of settings.

Embodiments described herein provide a method of automatically saving a configuration file of a system in a document, where the document is generated with the system and where the document is not meant to store configuration settings. For example, applications typically have complex user interfaces with a wide range of menus, submenus, dialogs, and options allowing the user to customize and control functions provided by the applications. For example, an application such as the MICROSOFT WORD word processor includes many menus, with each menu including a wide selection of submenus and menu options. It is often the case that a user defines a set of default settings associated with a system. For example, the MICROSOFT WORD word processor enables a user to define a set of default settings, including default font formatting, autocorrect options, paste options, page layout options, etc. Defining default settings can be time-consuming. In addition, certain autocorrect options can be a source of great frustration to users. When a user is using the same application in a different computer, then the settings used by the application are the locally stored settings, rather than the user's preferred settings.

Embodiments described herein enable configuration settings of an application to be embedded in documents generated by the system. This can be performed automatically or by giving the user the option to enable or disable this option. The user can also be given the choice to edit the types of settings to be embedded in documents generated. For example, a user can specify that only the user interface visual theme is to be included in the configuration file embedded in the document.

Settings of a system, embedded as configuration data, can also include the type of information to include in the report as visible elements. These settings can include the level of details in the report/document, the use of particular summaries and types of charts, the use of numeric summaries versus textual summaries, the type of information to include in the summaries and charts, the formatting of the summaries and charts, the types of statistical summaries to include, the inclusion of user provided notes, the inclusion and formatting of timestamps, etc. The embedding of these settings as configuration data in a report/document enables a user to specify once the type of content to include in a report/document, and replicate the visible elements included in the report in other systems by simply loading the report/document into the other systems. This would also enable a first user to emulate the formatting and the visible elements from a report/document generated by a second user by loading the document/report into the testing system of the first user. The embedding of these settings can be configured through a dialog window of the system or through a configuration file of the system.

In one embodiment, the settings embedded as configuration data can include style and formatting settings/properties of the generated report/document. These settings can include the document/report font size and font type, page layout settings, margin settings, page size settings, line spacing settings, paragraph formatting, and other settings specifying the formatting of the actual content in the report/document. These settings can also include compatibility with various PDF viewers, compatibility with other document types (if the generated report is a file format other than PDF), the resolution of the report/document, the compression level of the report/document, the compression of any images and charts included in the report/document, the embedding of fonts in the report/document, color settings, etc. As noted above, the embedding of these settings can be configured through a dialog window of the system or through a configuration file of the system. In embodiments disclosed herein, a user need only load a file generated with the desired settings and with the appropriate formatting, and these settings can be extracted from a file embedded in the document. Thus, rather than having to deal with a configuration file, or having to save a configuration file or script in the appropriate directory structure, the user need only load a document and all of the settings can be extracted from the configuration file embedded in the document.

An embodiment is directed to a computer-implemented method of embedding configuration data in a non-configuration document generated by a testing system, comprising the steps of performing a test on a device under test with the testing system, the testing system configured to use one or more parameters among a plurality of parameters of the testing system (i.e. a plurality of system settings) to perform the test; generating the non-configuration document through the testing system, the non-configuration document including one or more results associated with the test, a file format of the non-configuration document supporting embedding of additional data; aggregating the one or more parameters into a configuration set; and automatically embedding the configuration set in the non-configuration document.

Yet another embodiment is directed to a computer-implemented method of rerunning a previous test performed with a testing system on a device under test, comprising the steps of importing a non-configuration document generated by the testing system after execution of the previous test, the non-configuration document including one or more results associated with the previous test and including an embedded configuration data with one or more settings among a plurality of system settings used by the testing system to perform the previous test; extracting the embedded configuration data from the non-configuration document; applying the one or more settings to the testing system; and enabling execution of a new test using the one or more settings on the device under test.

While the present disclosure illustrates and describes a preferred embodiment and several alternatives, it is to be understood that the techniques described herein can have a multitude of additional uses and applications. Accordingly, the invention should not be limited to just the particular description and various drawing figures contained in this specification that merely illustrate various embodiments and application of the principles of such embodiments.

What is claimed is:

1. A computer-implemented method of embedding configuration data in a non-configuration document generated by a testing system, comprising the steps of:

performing a test on a device under test with the testing system, the testing system configured to use one or more system settings among a plurality of system settings of the testing system to perform the test;

generating the non-configuration document through the testing system, the non-configuration document including one or more results associated with the test, a file format of the non-configuration document supporting embedding of additional data;

aggregating the one or more system settings into a configuration set; and automatically embedding the configuration set in the non-configuration document; and further comprising enabling a user of the testing system to rerun the test, said enabling including enabling the user to load the non-configuration document to the testing system.

2. The method as recited in claim 1, wherein the step of aggregating the one or more system settings into a configuration set further includes the steps of:

displaying the plurality of system settings;

enabling the user to select a set of user selected settings among the plurality of system settings; and adding the set of user selected settings to the configuration set.

3. The method as recited in claim 1, wherein the plurality of system settings includes settings of the device under test.

4. The method as recited in claim 1, wherein the plurality of system settings includes user interface settings of the testing system.

5. The method as recited in claim 1, wherein the step of embedding the configuration set in the non-configuration document includes the steps of:

storing the configuration set in a configuration file; and embedding the configuration file in the non-configuration document.

6. The method as recited in claim 1, wherein the step of embedding the configuration set in the non-configuration document includes the step of storing the configuration set in one or more metadata fields of the non-configuration document.

7. The method as recited in claim 1, further comprising the step of enabling a user of the testing system to load the one or more system settings into the testing system by importing the non-configuration document into the testing system.

8. The method as recited in claim 1, wherein the step of enabling a user of the testing system to rerun the test comprises, after enabling the user to load the non-configuration document to the testing system, rerunning the test on the device under test with the testing system, including the steps of:

extracting the configuration set from the non-configuration document;

applying the one or more system settings from the configuration set to the testing system; and performing the test on the device under test with the testing system.

9. The method as recited in claim 1, wherein the step of enabling a user of the testing system to rerun the test comprises, after enabling the user to load the non-configuration document to the testing system rerunning the test on a different device under test with the testing system, including the steps of:

extracting the configuration set from the non-configuration document;

applying the one or more system settings from the configuration set to the testing system; and performing the test on the different device under test with the testing system.

10. The method as recited in claim 1, wherein the plurality of system settings includes formatting and style settings of the non-configuration document.

11. A computer-implemented method of rerunning a previous test performed with a testing system on a device under test, comprising the steps of:

importing a non-configuration document generated by the testing system after execution of the previous test, the non-configuration document including one or more results associated with the previous test and including an embedded configuration data, the embedded configuration data including one or more settings among a plurality of system settings used by the testing system to perform the previous test;

extracting the embedded configuration data from the non-configuration document;

applying the one or more settings to the testing system; and enabling execution of a new test of the device under test with the testing system, the testing system using the one or more settings.

12. The method as recited in claim 11, wherein the step of applying the one or more settings includes the step of:

displaying to the user one or more current values associated with the one or more settings in the testing system; and enabling the user to select at least one value among the one or more current values to be overridden with a corresponding value from the one or more settings.

13. The method as recited in claim 11, wherein the embedded configuration data includes one or more external settings associated with the device under test, further comprising the step of applying the one or more external settings to the device under test.

14. A computer-implemented method of embedding configuration data in a non-configuration document generated by a system, comprising the steps of:

generating the non-configuration document through the system, the system configured to generate non-configuration documents using one or more functions provided by the system and using one or more system settings among a plurality of system settings of the system, a content of the non-configuration document not including the one or more system settings, a file format of the non-configuration document configured to support embedding of additional data;

aggregating the one or more system settings into a configuration set; and embedding the configuration set in the non-configuration document; and further comprising enabling a user of the system to reuse the one or more system settings when generating a different non-configuration document with a different system, including enabling the user to load the non-configuration document into the different system.

15. The method as recited in claim 14, wherein the step of aggregating the one or more system settings into a configuration set further includes the steps of:

displaying to a user of the system the plurality of system settings;

enabling the user to select a set of user selected settings among the plurality of system settings; and adding the set of user selected settings to the configuration set.

16. The method as recited in claim 14, wherein the plurality of system settings includes user interface settings of the system.

17. The method as recited in claim 14, wherein the step of embedding the configuration set in the non-configuration document includes the steps of:

storing the configuration set in a configuration file; and embedding the configuration file in the non-configuration document.

18. The method as recited in claim 14, wherein the step of embedding the configuration set in the non-configuration document includes the step of storing the configuration set in one or more metadata fields of the non-configuration document.

19. The method as recited in claim 14, further comprising the step of enabling a user of the system to load the one or more system settings to the system by loading the non-configuration document into the system.

20. The method as recited in claim 14, wherein the step of enabling a user of the system to reuse the one or more system settings when generating a different non-configuration document with a different system further includes extracting the configuration set from the non-configuration document;

applying the one or more system settings from the configuration set to the different system; and enabling the user to generate the different non-configuration document using the one or more system settings.

* * * * *